Jan. 28, 1969  P. E. STRIFLER  3,424,449
HYDROPNEUMATIC SPRING FOR VEHICLES, ESPECIALLY
COMMERCIAL TYPE VEHICLES
Filed Dec. 9, 1966
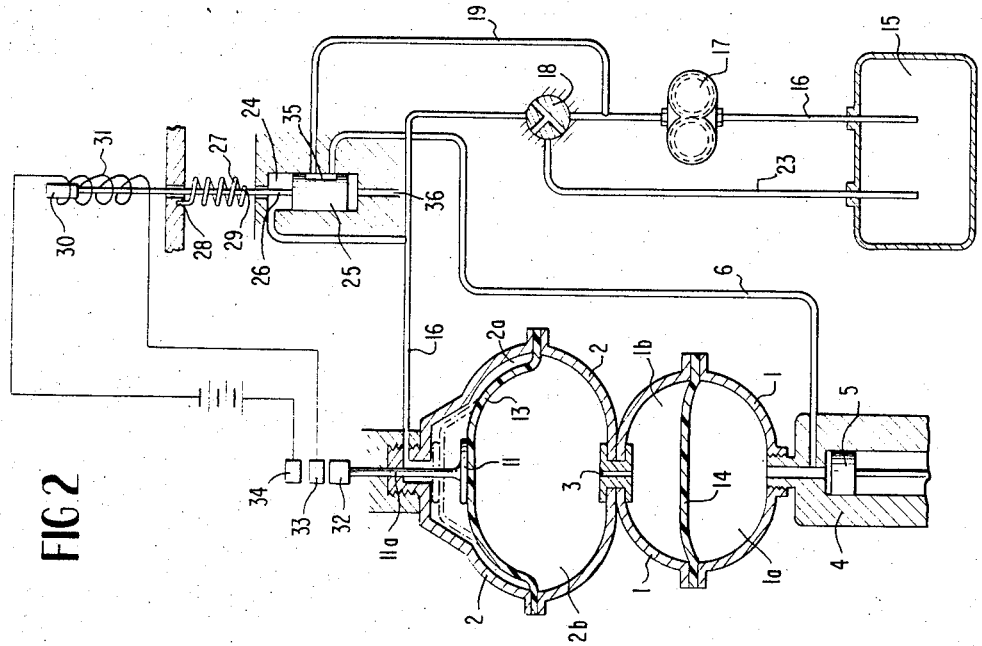
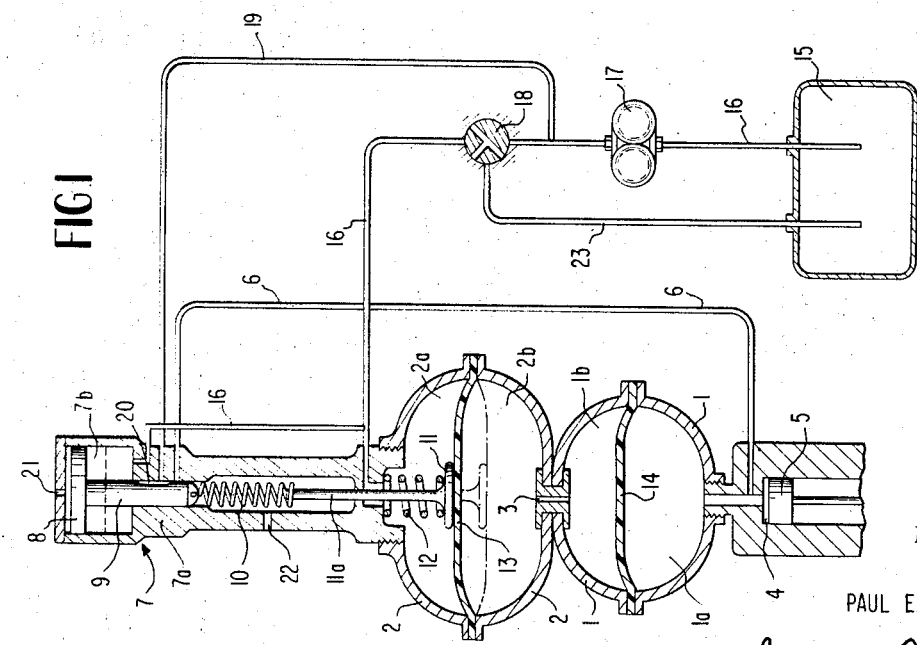
INVENTOR
PAUL E. STRIFLER
BY Dicke & Craig
ATTORNEYS United States Patent Office 3,424,449
Patented Jan. 28, 1969

3,424,449
HYDROPNEUMATIC SPRING FOR VEHICLES, ESPECIALLY COMMERCIAL TYPE VEHICLES
Paul E. Strifler, Dettingen, Teck, Germany, assignor to Daimler-Benz Aktiengesellschaft, Stuttgart-Unterturkheim, Germany
Filed Dec. 9, 1966, Ser. No. 600,602
Claims priority, application Germany, Dec. 11, 1965, D 48,896
U.S. Cl. 267—64          5 Claims
Int. Cl. B60g 11/26; F16f 3/00, 13/00

ABSTRACT OF THE DISCLOSURE

A hydropneumatic spring system, especially for commercial type vehicles, in which a reserve air space is coordinated by way of a throttled passage to the working air space and a body level adjusting system is provided to maintain substantially constant the height of the body by pumping oil from the hydraulic pressure system into the hydraulic section of the reserve air space in case of increases in the load and vice versa, and in which oil losses at the working piston are replenished from the hydraulic pressure system by a control device which selectively controls the supply of hydraulic pressure medium to the working piston in dependence on the oil losses as represented by the volume of the air in the reserve air space. The control device may be in the form of a slide valve whose position changes in accordance with changes of the position of the diaphragm in the reserve air space. Additionally, a further control, for example, in the form of an electromagnet may be provided which permits a replenishing of oil losses only when the vehicle is in the unloaded condition.

*Background of the invention*

The present invention relates to a hydropneumatic spring for vehicles, and more particularly relates to a hydropneumatic spring installation for commercial types of vehicles provided with an automatic level adjusting mechanism to maintain a predetermined height of the body.

With commercial types of vehicles large changes in the loads of the springs occur in dependence on the load of the vehicle. A hydropneumatic spring would therefore respond much more stiffly with a loaded vehicle than with an empty vehicle.

A constant air spring volume is a prerequisite for a constant natural frequency of the spring system. In order to attain a constant natural frequency, it is already known in the prior art to provide, in addition to the working air space, a reserve air space which is connected with the working air space by way of a narrow passage or constricted aperture so that with pressure changes of higher frequencies no air change takes place.

With changes of the vehicle load oil is discharged out of the reserve air space or supplied into the reserve air space by way of a pump by means of a height-adjusting valve which is controlled in dependence on the distance of a point at the frame and at the body relative to one another, until the predetermined height of the body is realized again.

However, it is unavoidable thereby that oil losses occur at the working piston of the spring. As a result thereof, the air spring space becomes larger and the spring correspondingly softer.

*Summary of the invention*

The present invention is therefore concerned with the aim to create a hydropneumatic spring in which the oil loss at the working piston is automatically compensated for and therewith the natural frequency of the spring is kept constant.

This is achieved according to the present invention with a hydropneumatic spring which is provided with a working air space and a reserve air space connected with each other by way of a narrow aperture, and in which in case of heavier loads of the vehicle oil is pumped into the reserve air space and air is thereby forced in the working air space until the vehicle body has a predetermined height, in that a connection between the oil pump and the cylinder of the working piston is selectively established or interrupted in dependence on the volume of the air present in the reserve air space.

Accordingly, it is an object of the present invention to provide a hydropneumatic spring of the type described above which effectively eliminates the aforementioned shortcomings and drawbacks encountered in the prior art constructions.

Another object of the present invention resides in a hydropneumatic spring which maintains substantially constant the natural frequency of the spring system under all operating conditions.

A further object of the present invention resides in a hydropneumatic spring, especially for commercial-type vehicles, in which oil losses in the working cylinder of the spring system are automatically compensated for.

These and other objects, features and advantages of the present invention will become more obvious from the following description when taken in connection with the accompanying drawing which shows, for purposes of illustration only, two embodiments in accordance with the present invention, and wherein:

FIGURE 1 is a partial, somewhat schematic cross-sectional view through a hydropneumatic spring system in accordance with the present invention; and FIGURE 2 is a partial, somewhat schematic cross-sectional view through a modified embodiment of the spring system in accordance with the present invention.

Referring now to the drawing wherein like reference numerals are used throughout the two views to designate like parts, and more particularly to FIGURE 1, the working air space 1 and the reserve air space 2 of the spring system are connected with each other by way of a narrow aperture or passage 3. The cylinder 4 in which is arranged the working piston 5, is in communication by way of a conduit or pipe line 6 with the constricted or narrower portion 7a of a pressure chamber generally designated by reference numeral 7, in which a control piston 8 is slidably arranged which is provided at its bottom side with a slide member 9. The slide member 9 is connected by way of a draw spring 10 secured to the lower end thereof with the rod 11a of a control disk or plate 11 which is under the influence of a compression spring 12. The control disk or plate 11 rests against a diaphragm 13 which separates from each other the oil and air sections 2a and 2b of the reserve air space 2. The working air space 1 is provided with a corresponding diaphragm 14 for the subdivision into an oil section 1a and into an air section 1b. A pipe line or conduit 16 coming from an oil container or reservoir 15, into which are connected an oil pump 17 and a height-adjusting valve 18 of any conventional construction, terminates on the one hand, in the oil space 2a of the reserve air space 2 and, on the other, below the control piston 8 in the enlarged portion 7b of the pressure chamber 7 so that the control piston 8 is acted upon at its bottom or underside by the level-or height-dependent oil pressure.

A branch line 19 branching off from the line or conduit 16 between the oil pump 17 and the height-adjusting valve 18 terminates like the line 6 in the constricted or narrower portion 7a of the pressure chamber 7, and more particularly in such a manner that at a predetermined height position of the control piston 8 together with the slide member 9 secured thereto the lines 6 and 19 are connected with each other by way of an aperture or recess 20 in the slide member 9.

Reference numeral 21 and 22 designate venting bores in the pressure chamber 7.

The line 23 leading from the height-adjusting valve 18 directly to the oil reservoir 15 serves for discharging oil out of the oil section 2a of the reserve air space 2.

Operation

The operation of the hydropneumatic spring of FIGURE 1 is as follows:

The lower surface of the control piston 8 and the characteristic of the draw spring 10 have to be matched to one another in such a manner that, assuming a constant oil quantity in the cylinder 4 and in the oil section 1a of the working air space 1, the force exerted by the oil on the underside of the control piston 8 is slightly larger than the force of the draw spring 10. With larger oil losses at the working piston 5, the control disk or plate drops to a lower position whereby the spring force of the draw spring 10 and therewith the force exerted on the control piston 8 becomes larger until the control piston 8 together with the slide member 9 is pulled downwardly into the position thereof indicated in dash line in the drawing. The connection between the two lines or conduits 6 and 19 is now opened up by the aperture or recess 20 in the slide member 9, and oil is pumped from the pump 17 into the cylinder 4 and therewith into the oil section 1a of the working air space 1 until the control disk or plate 11 is again pressed upwardly by the diaphragm 13 into its original position and therewith also the control piston 8 slides upwardly so that the slide member 9 again interrupts the connection between the lines 6 and 19.

The embodiment illustrated in FIGURE 2 illustrates an arrangement in which a replenishing of oil leakage losses in the cylinder 4 of the working piston 5 is possible only with an unloaded vehicle when the control disk or plate 11 does not return to its normal position indicated in FIGURE 2 in dash lines.

A rod 26 is secured at the control slide valve member 25 arranged in a pressure chamber 24 on the side thereof acted upon by the oil pressure dependent on the height of the body; the rod 26 extends thereby outside of the pressure chamber 24. The pressure chamber 24 is provided with a venting bore 36 on the side thereof opposite the aperture through which extends the rod 26. A draw-spring 27 acts on the rod 26 and therewith on the control slide member 25. The draw-spring 27 is fixedly secured at 28 to a relatively fixed part of the vehicle at one end thereof and is secured at the other end thereof at 29 to the rod 26.

Furthermore, an armature 30 is mounted on the rod 26 which is displaceably arranged within an electric coil or winding 31.

The current flow in the winding 31 is initiated by a contact plate 32 secured at the rod 11a of the control disk 11; when the control disk or plate 11 returns to its normal position as indicated in dash line, the contact plate 32 connects with each other the contacts 33 and 34. As a result of such contact, a force is then exerted by the magnetic field of the coil 31 on the armature 30 which force is directed oppositely to the force of the draw-spring 27 and together with the height- or level-dependent oil pressure acts on the slide member 25, urging the same downwardly against the force of spring 27.

The draw-spring 27 should be so dimensioned that the force exerted thereby on the slide member 25 is larger than the level-dependent oil pressure with an unloaded vehicle.

If now the control disk or plate 11 with an unloaded vehicle, stays in the position illustrated in the drawing in full lines, then the contacts 33 and 34 are not connected so that only the force of the draw-spring 27 and of the level-dependent oil pressure act on the slide member 25.

Since in this case the force of the draw-spring 27 predominates, the slide member 25 is pulled upwardly and the lines 6 and 19 terminating in the pressure chamber 24 are thereby connected with each other by way of the aperture or recess 35 in the slide member 25 as shown in FIGURE 2.

While I have shown and described two embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A hydropneumatic spring for vehicles, especially for commercial-working piston means and operatively connected with a working air space, and a reserve air space connected with the working air space by way of a narrow aperture, and in which oil is pumped from an oil pressure system into the reserve air space during heavier loading of the vehicle to force air from the reserve air space into the working air space until a predetermined height of the body of the vehicle is achieved, wherein the improvement comprises control means operatively connecting and disconnecting the oil pressure system with said cylinder means in dependence on the volume of air present in the reserve air space and means subdividing the reserve air space into an oil section and into an air section.

2. A hydropneumatic spring according to claim 1, said last mentioned means being a diaphragm, a spring-loaded control disk means in engagement with said diaphragm means, spring means normally urging said control disk means into engagement with said diaphragm means, said control means including a pressure chamber accommodating therein a control piston and a slide member operatively connected with said control piston, said control piston being so arranged in said pressure chamber that the oil pressure dependent on the body height acts on one side of the control piston while the spring means acts on the opposite side and is so dimensioned that with a movement of the control disk means in the direction corresponding to an oil loss in the working cylinder means, the control piston together with the slide member is so displaced that an aperture in the slide member establishes a connection between a line coming from the pressure system and a line leading to the cylinder means.

3. A hydropneumatic spring according to claim 2, wherein the lower side of the control piston means is provided with said slide member, the lower side of the control piston means being acted upon by the height-dependent oil pressure, and the spring means being a draw-spring so dimensioned that with a lowering of the control disk means, the control piston together with the control slide member is pulled downwardly.

4. A hydropneumatic spring according to claim 1, said last mentioned means being a diaphragm, control disk means in engagement with the diaphragm means, said control means including control slide valve means having a slide member arranged in a pressure chamber and provided with an aperture, connecting means including a connecting line from said pressure system to the control means and another connecting line from the control means to the working cylinder means and further means operatively connecting said control disk means with said control means for establishing by the aperture in said slide member a connection between said two connecting lines with only an unloaded vehicle and with an oil loss in the working cylinder means.

5. A hydropneumatic spring according to claim 4, wherein said further means includes a draw-spring operatively connected with said slide member, means for actuating the slide member by the level-dependent oil pressure in a direction opposite the spring force exerted by said draw-spring, and means for applying an additional magnetic force on said slide member with said control disk means in the normal position thereof, when the vehicle is unloaded, the force of the draw-spring normally overcoming the level-dependent oil pressure corresponding to an unloaded vehicle in the absence of the additional magnetic force to displace the slide member in such a manner that a communication is established between said two connecting lines by the aperture in the slide member.

References Cited

UNITED STATES PATENTS 3,033,552    5/1962    Ogden _____ 267—1

ARTHUR L. LA POINT, *Primary Examiner.*

R. M. WOHLFARTH, *Assistant Examiner.*